United States Patent
Murthy et al.

(10) Patent No.: US 11,072,424 B2
(45) Date of Patent: Jul. 27, 2021

(54) CARGO INTELLIGENT RESTRAINT SYSTEM

(71) Applicant: Goodrich Corporation, Charlotte, NC (US)

(72) Inventors: Ravi Murthy, Bangalore (IN); Thirunavukkarasu Ramalingam, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 402 days.

(21) Appl. No.: 16/121,257

(22) Filed: Sep. 4, 2018

(65) Prior Publication Data

US 2019/0256211 A1   Aug. 22, 2019

(30) Foreign Application Priority Data

Feb. 19, 2018   (IN) .............................. 201811006231

(51) Int. Cl.
   *B64D 9/00*   (2006.01)
(52) U.S. Cl.
   CPC .............. *B64D 9/003* (2013.01); *B64D 9/00* (2013.01); *B64D 2009/006* (2013.01)
(58) Field of Classification Search
   CPC ..... B64D 9/003; B64D 9/00; B64D 2009/006
   See application file for complete search history.

(56) References Cited

U.S. PATENT DOCUMENTS

| | | | | |
|---|---|---|---|---|
| 4,349,302 A * | 9/1982 | Ferguson, Jr. | ......... | B64D 9/003 410/46 |
| 4,375,932 A * | 3/1983 | Alberti | ................ | B64D 9/003 244/137.3 |
| 5,265,991 A * | 11/1993 | Herrick | ................ | B64D 9/003 244/118.1 |
| 5,310,297 A * | 5/1994 | Benjamin | ............... | B64D 9/00 244/118.1 |
| 8,788,085 B2 | 7/2014 | Panzram et al. | | |
| 8,936,419 B1 * | 1/2015 | Islam | ....................... | B64C 1/20 410/80 |
| 9,085,364 B2 | 7/2015 | Huber et al. | | |
| 2004/0108416 A1 * | 6/2004 | Parkinson | ............... | B64D 9/00 244/137.4 |
| 2010/0100225 A1 * | 4/2010 | Reed | ....................... | B64D 9/00 700/213 |
| 2017/0106966 A1 * | 4/2017 | Himmelmann | ........... | B64C 1/20 |

* cited by examiner

*Primary Examiner* — Brian M O'Hara
*Assistant Examiner* — Keith L Dixon
(74) *Attorney, Agent, or Firm* — Cantor Colburn LLP

(57) ABSTRACT

An intelligent restraint system architecture for aircraft cargo is provided. The intelligent restraint system architecture includes restraints arrayed along a cargo deck and local restraint control panels (RCPs). Each restraint is configured to normally assume a retracted condition at which cargo movement proximate to the restraint is permitted and to selectively assume an erected condition at which cargo movement proximate to the restraint is inhibited by the restraint. The local RCPs are respectively coupled to proximal restraints. Each local RCP is receptive of a signal indicative of a cargo movement status and is configured to automatically control each of the proximal restraints to selectively assume the erected condition or to re-assume the retracted condition in accordance with the signal being received and content thereof.

18 Claims, 4 Drawing Sheets

CARGO INTELLIGENT RESTRAINT SYSTEM

CROSS-REFERENCE TO RELATED APPLICATIONS

This application claims the benefit of Indian Application No. 201811006231 filed Feb. 19, 2018, which is incorporated herein by reference in its entirety.

BACKGROUND

The following description relates to a cargo restraint system and, more specifically, to an intelligent restraint system architecture for air cargo.

Cargo handling systems of aircrafts typically include devices, such as line replaceable units (LRUs), to secure unit load devices (ULDs) of a cargo payload during flight. Without the LRUs, the ULDs would tend to move in the cargo deck during landing, takeoff and flight maneuvers due to various changes in acceleration and flight loads. The LRUs, which may be provided as restraints, serve to arrest ULD movement and thereby protect the ULDs from damage and maintain a center of gravity of the aircraft within safety limits.

Typically, locations of the restraints are derived based on the type and size of ULDs and the desired cargo layout used on the aircraft. The restraints are then positioned in either an erected condition or a retracted condition. The erected condition is characterized in that the restraint resists ULD movements during flight operations and can be manually established by loading personnel. The retracted condition is characterized in that the restraint pawls of each restraint are disposed below the conveyor plane and, as such, the restraint in the retracted position allows relatively free ULD movement above the restraint inside the cargo deck. The retracted condition can be manually established by the loading personnel.

A typical cargo deck of an aircraft can include more than one hundred restraints. As explained above, each of these need to be manipulated by the loading personnel into assuming the erected condition or the retracted condition for every loading and unloading cycle (i.e., landing and takeoff).

BRIEF DESCRIPTION

According to an aspect of the disclosure, an intelligent restraint system architecture for aircraft cargo is provided. The intelligent restraint system architecture includes restraints arrayed along a cargo deck and local restraint control panels (RCPs). Each restraint is configured to normally assume a retracted condition at which cargo movement proximate to the restraint is permitted and to selectively assume an erected condition at which cargo movement proximate to the restraint is inhibited by the restraint. The local RCPs are respectively coupled to proximal restraints. Each local RCP is receptive of a signal indicative of a cargo movement status and is configured to automatically control each of the proximal restraints to selectively assume the erected condition or to re-assume the retracted condition in accordance with the signal being received and content thereof.

In accordance with additional or alternative embodiments, local power drive units (PDUs) to power proximal RCPs.

In accordance with additional or alternative embodiments, each of the restraints includes a sensor to sense the cargo movement proximate to the restraint and a transmitter configured to generate and issue the signal based on a sensing result of the sensor.

In accordance with additional or alternative embodiments, each of the restraints further includes a secondary sensor to report a currently assumed condition of the restraint to the corresponding local RCP.

In accordance with additional or alternative embodiments, each of the local RCPs includes an override switch.

In accordance with additional or alternative embodiments, a master restraint control panel (MRCP) is disposed in signal communication with each of the local RCPs.

In accordance with additional or alternative embodiments, each of the local RCPs includes a transceiver to communicate with the MRCP.

In accordance with additional or alternative embodiments, the MRCP acts as a control and information gateway between each of the local RCPs.

In accordance with additional or alternative embodiments, the MRCP includes a portable computing device.

According to another aspect of the disclosure, an intelligent restraint system architecture for aircraft cargo is provided. The intelligent restraint system architecture includes a cargo deck having a longitudinal axis, restraints arrayed in lines traversing the longitudinal axis and local restraint control panels RCPs). Each restraint is configured to normally assume a retracted condition at which cargo movement along the longitudinal axis and proximate to the restraint is permitted and to selectively assume an erected condition at which cargo movement along the longitudinal axis and proximate to the restraint is inhibited by the restraint. The RCPs are arranged along the longitudinal axis and are respectively coupled to proximal lines of restraints. Each local RCP is receptive of a signal indicative of a cargo movement status and is configured to automatically control each of the proximal lines of restraints to selectively assume the erected condition or to re-assume the retracted condition in accordance with the signal being received and content thereof.

In accordance with additional or alternative embodiments, local power drive units (PDUs) power proximal lines of RCPs.

In accordance with additional or alternative embodiments, each of the restraints includes a sensor to sense the cargo movement proximate to the line of the restraint and a transmitter configured to generate and issue the signal based on a sensing result of the sensor.

In accordance with additional or alternative embodiments, each of the restraints further includes a secondary sensor to report a currently assumed condition of the restraint to the corresponding local RCP.

In accordance with additional or alternative embodiments, each of the local RCPs includes an override switch.

In accordance with additional or alternative embodiments, a master restraint control panel (MRCP) is disposed in signal communication with each of the local RCPs.

In accordance with additional or alternative embodiments, each of the local RCPs includes a transceiver to communicate with the MRCP.

In accordance with additional or alternative embodiments, the MRCP acts as a control and information gateway between each of the local RCPs.

In accordance with additional or alternative embodiments, the MRCP includes a portable computing device.

According to yet another aspect of the disclosure, a method of operating an intelligent restraint system architecture is provided. The method includes determining whether cargo movement is occurring, automatically issuing instructions from a single control panel to restraints associated with the control panel in accordance with a result of the determining, confirming whether the restraints respond to the instructions and issuing an alert from the single control panel in an event the restraints do not respond to the instructions.

In accordance with additional or alternative embodiments, the method further includes arraying the restraints in lines traversing a longitudinal axis of a cargo deck and associating the single control panel and other single control panels with proximal lines of restraints.

In accordance with additional or alternative embodiments, the method further includes determining whether cargo movement is occurring as part of a loading process, the determining of whether cargo movement is occurring includes determining whether the cargo movement is halted and the automatically issuing of the instructions from the single control panel includes instructing the restraints associated with the control panel to assume an erected condition.

In accordance with additional or alternative embodiments, the method further includes determining whether cargo movement is occurring as part of an unloading process and the automatically issuing of the instructions from the single control panel includes instructing the restraints associated with the control panel to assume a retracted condition.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, an intelligent restraint system architecture for air cargo is provided and overcomes issues with conventional systems. Those issues are that restraints of conventional systems need to be manipulated into assuming the erected condition or the retracted condition in an overly laborious task that often requires a minimum of two loaders to load or unload the ULDs with the probability of improper locking due to the manual operation, the need for visual locking verification and the fact that in-flight, accidental un-locking cannot be verified. The intelligent restraint system architecture for air cargo, however, provides for electronically operated restraints where conditions of the restraints are controlled electronically through a restraint control panel (RCP) or through a master restraint control panel (MRCP) module on an interface of a wired or wireless computing device (e.g., a tablet, a smartphone, a laptop, etc.) and allows a condition status of the restraints to be available via the RCP and the MRCP module.

Figure 1:
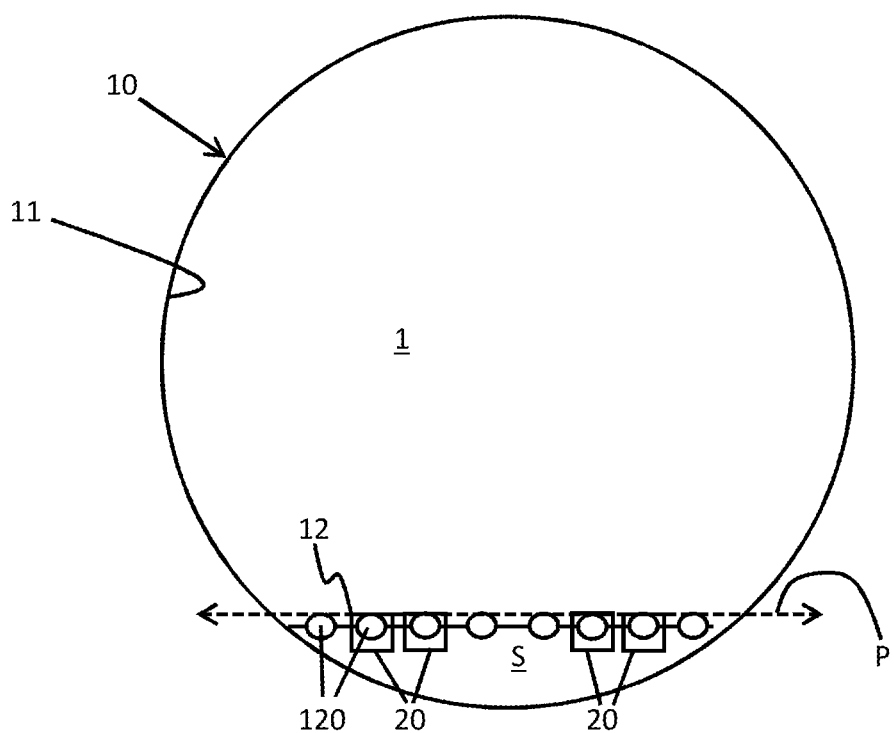
FIG. 1 is an axial view of a cargo deck of an aircraft in accordance with embodiments.
Figure 2:
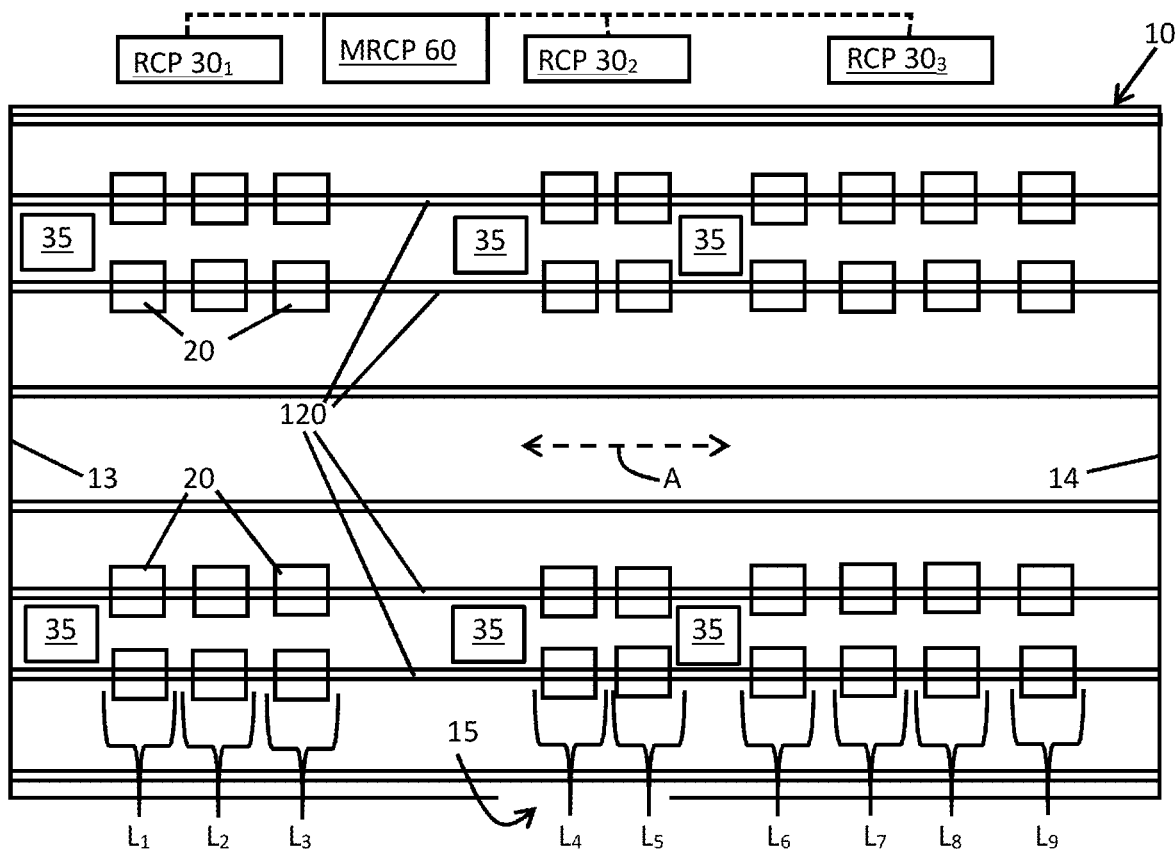
FIG. 2 is a top-down view of the cargo deck of FIG. 1.

With reference to FIGS. 1 and 2, an intelligent restraint system architecture 1 is provided for aircraft cargo and includes or is usable with a cargo deck 10 of an aircraft for example. With reference to FIG. 1, a cargo deck 10 of an aircraft is disposed within a section of fuselage 11 which is substantially tubular and which includes a cargo deck surface 12, forward and aft end walls 13 and 14 and a doorway 15. The cargo deck surface 12 includes rails 120. The rails 120 extend substantially in parallel with one another and at a substantially same level with one another such that the cargo deck surface 12 effectively extends flatly along at least a part of the lower portion of the section of the fuselage 11 with a longitudinal axis A that may run along a longitudinal axis of the section of the fuselage 11. Respective upper surfaces of each of the rails 120 of the cargo deck surface 12 cooperatively define a cargo movement plane P. The substantial flatness of the cargo deck surface 12 and the curvature of the section of the fuselage 11 defines a space S between the interior fuselage surface 110 and the cargo movement plane P.

The intelligent restraint system architecture 1 further includes restraints 20, local restraint control panels (RCPs) $30_{1-3}$ and local power drive units (PDUs) 35. As shown in FIG. 1, the restraints 20 are disposed in the space S. As shown in FIG. 2, the restraints 20 are arrayed along the rails 120 in lines $L_{1-9}$. The lines $L_{1-9}$ are formed with an orientation that traverses the longitudinal axis A. In some cases, the lines $L_{1-9}$ are perpendicular to the longitudinal axis A. Each restraint 20 can be selectively moved along a corresponding one of the rails 120 such that the position of the lines $L_{1-9}$ can be variable along the longitudinal axis A in accordance with an expected or known width of unit load devices (ULDs) 40 (see FIGS. 4A and 4B) which are stored in the cargo deck 10. The lines $L_{1-9}$ may extend across an entire span of the cargo deck surface 12 or may be formed as compound lines made up of shorter individual lines that extend across respective portions of the span of the cargo deck surface 12 at multiple longitudinal positions. The local PDUs 35 can drive ULD 40 movement and can provide power to the restraints 20 of the proximal lines $L_{1-9}$.

Figure 3A:
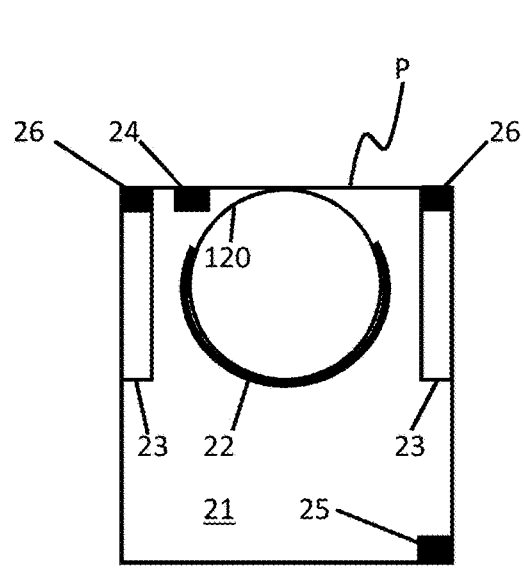
FIG. 3A is an enlarged view of a restraint of FIG. 1 in a retracted condition in accordance with embodiments.
Figure 3B:
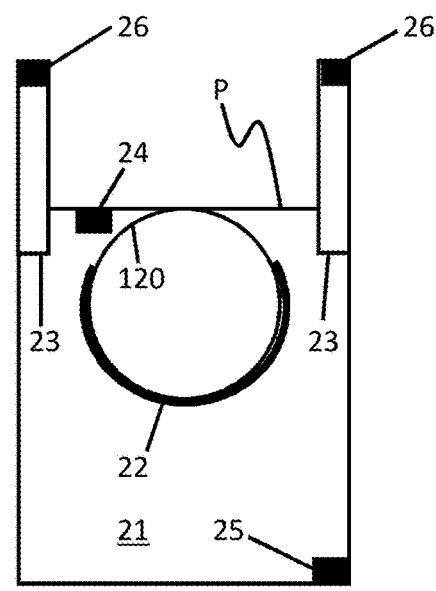
FIG. 3B is an enlarged view of a restraint of FIG. 1 in an erected condition in accordance with embodiments.

With reference to FIGS. 3A and 3B, each restraint 20 includes a main body 21, which is generally disposed below the cargo movement plane P, a latch 22 and pawls 23. The latch 22 attaches the main body 21 to a corresponding one of the rails 120. The pawls 23 are adjustable relative to the main body 21. In particular, each restraint 20 is able to assume a retracted condition (see FIG. 3A) or an erected condition (see FIG. 3B) based on the adjustment of the pawls 23. As shown in FIG. 3A, the retracted condition is characterized in that the pawls 23 are retracted below the cargo movement plane P. By contrast, as shown in FIG. 3B, the erected condition is characterized in that the pawls 23 are erected or extended into and above the cargo movement plane P. Each restraint 20 normally assumes the retracted condition.

Figure 4A:
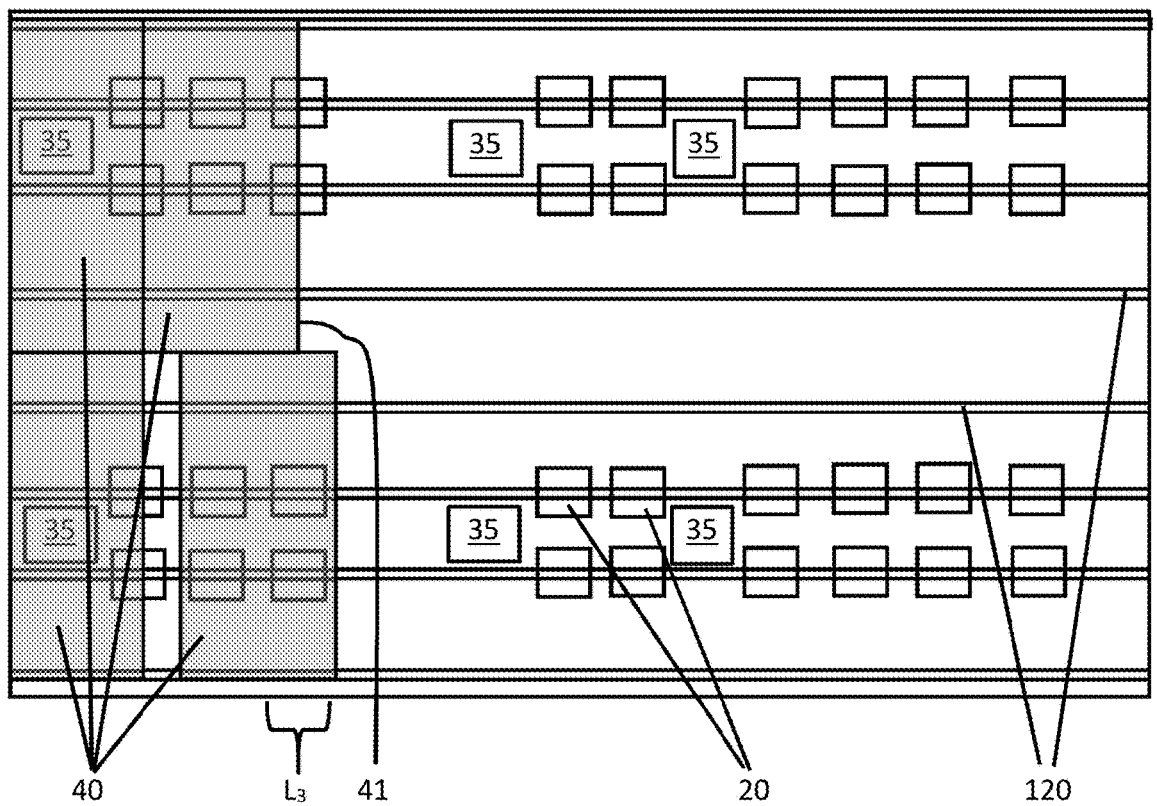
FIG. 4A is a top down view of an initial stage of a cargo deck loading process in accordance with embodiments.
Figure 4B:
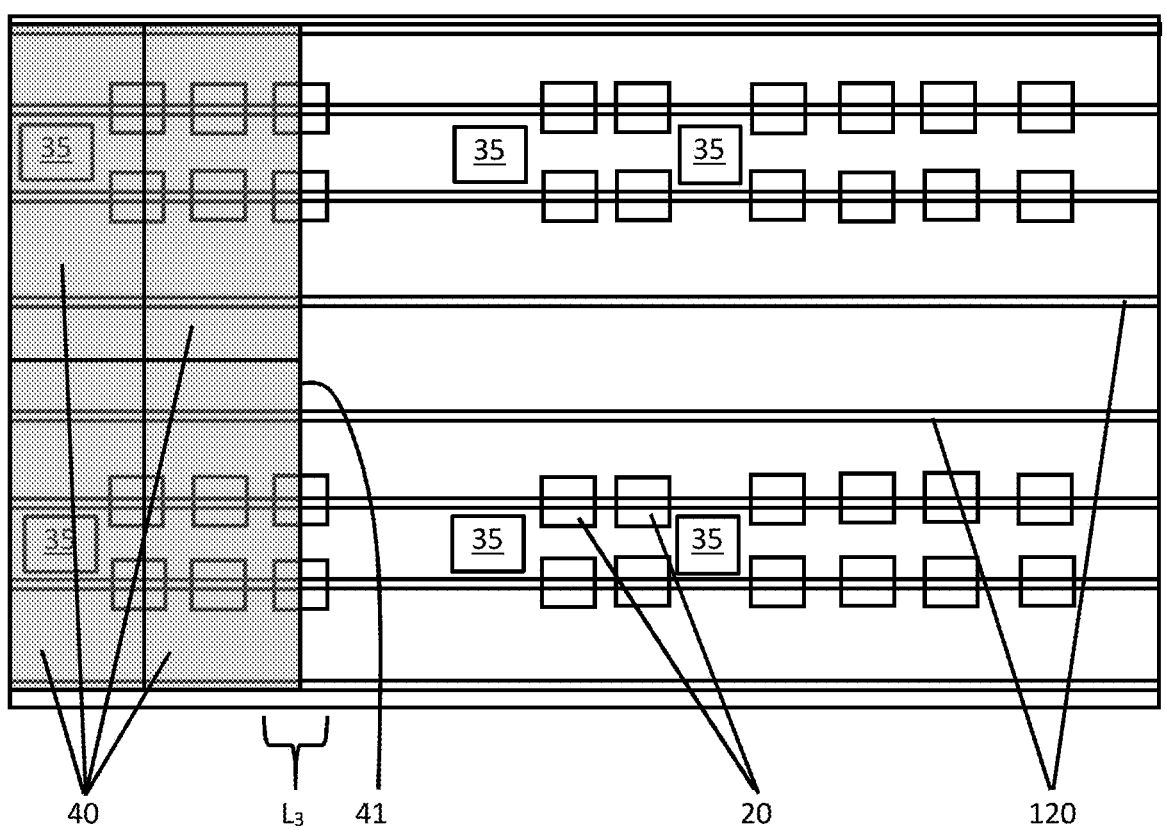
FIG. 4B is a top down view of a late stage of a cargo deck loading process in accordance with embodiments.

With reference back to FIG. 2 and with additional reference to FIGS. 4A and 4B, during cargo loading processes, the ULDs 40 are brought into the section of the fuselage 11 through the doorway 15 and moved toward either the forward end wall 13 or the aft end wall 14 along the rails 120 of the cargo deck surface 12. Thus, as shown in FIG. 4A, since each restraint 20 is normally provided in or controlled to assume the retracted condition, the pawls 23 of each restraint 20 do not inhibit the movement of the ULDs 40 along the cargo deck surface 12 as each ULD 40 moves over each restraint 20 toward its destination. However, as shown in FIG. 4B, once the ULDs 40 reach their destination, the restraints 20 that are positioned along the exposed ULD surface 41 are controlled to assume the extended condition. Here, the pawls 23 extend into and above the cargo movement plane P and abut with the exposed ULD surface 41 such that the ULDs 40 are constrained to remain in position at their destination.

The location of the restraints 20 along the exposed ULD surface 41 is preset with the knowledge of the number of and the width of each of the ULDs 40 to be stowed in the cargo deck 10.

During cargo unloading processes, the ULDs 40 are drawn out of position from their destination and are brought back through the section of the fuselage 11 along the rails 120 of the cargo deck surface 12 to the doorway 15 where they can be unloaded. To make this possible, the restraints 20 that are positioned along the exposed ULD surface 41 are controlled to reassume the retracted condition so that the pawls 23 return to below the cargo movement plane P where they do not inhibit movement of the ULDs 40.

With continued reference back to FIG. 2, the local RCPs $30_{1-3}$ are arranged along the longitudinal axis A and are respectively coupled to proximal ones or sets of the lines $L_{1-9}$ of the restraints 20. That is, local RCP $30_1$ is coupled or otherwise disposed in signal communication with the restraints 20 of lines $L_{1-3}$, local RCP $30_2$ is coupled or otherwise disposed in signal communication with the restraints 20 of lines $L_{4-5}$ and local RCP $30_3$ is coupled or otherwise disposed in signal communication with the restraints 20 of lines $L_{6-9}$. Each of the local RCPs $30_{1-3}$ is receptive of a signal which is indicative of cargo movement status (i.e., is a loading or unloading process in effect and, if so, what is the current progress). In addition, each of the local RCPs $30_{1-3}$ is configured to automatically control each of the proximal lines of restraints 20 to which it is coupled such that the corresponding restraints 20 selectively assume the erected condition (from the normally assumed retracted condition) or to re-assume the retracted condition in accordance with the signal being received and content of that signal.

The signal received by the local RCPs $30_{1-3}$ may be generated by and issued from multiple sources. These include, but are not limited to, sensors disposed in the cargo deck 10, sensors provided along the forward end wall 13 and the aft end wall 14 and the restraints 20. In the latter case, as shown in FIGS. 3A and 3B, each restraint 20 may further include a sensor 24 and a transmitter or transceiver 25. The sensor 24 is configured to sense the cargo movement of the ULDs 40 proximate to the restraint 20 or, more generally, to the one of the lines $L_{1-9}$ to which the restraint 20 belongs. The transmitter or transceiver 25 is configured to generate and issue the signal based on a sensing result of the sensor 24.

In any case, as shown in FIGS. 3A and 3B, each restraint 20 may also include a secondary sensor 26. The secondary sensor 26 may be configured to sense a currently assumed condition of the restraint 20 and to report (or have the transmitter 25 report) such currently assumed condition to the corresponding one of the local RCPs $30_{1-3}$.

Figure 5:
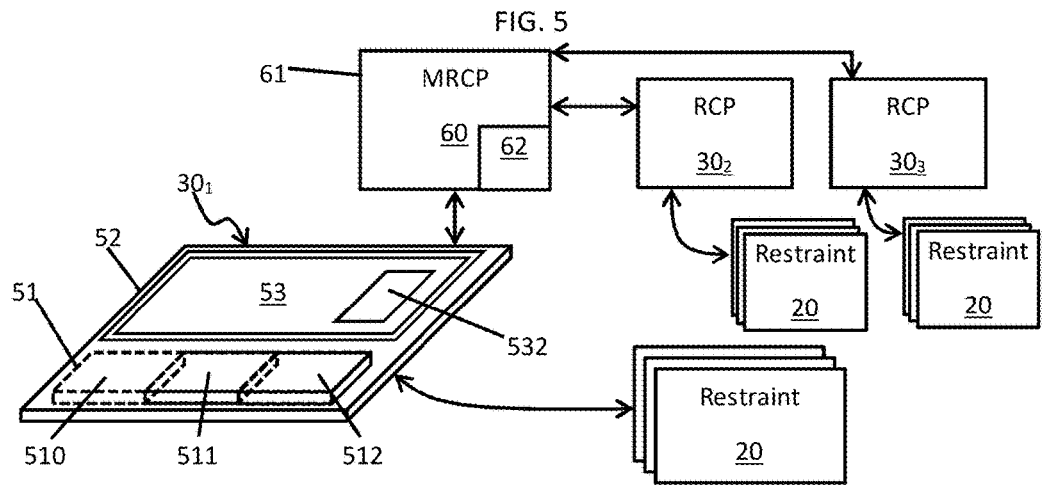
FIG. 5 is a schematic diagram of a local restraint control panel in accordance with embodiments.

With reference to FIG. 5, each of the local RCPs $30_{1-3}$ may include a processing element 51 and may include or be provided as a control panel 52 that is formed to define or display a user interface 53.

The processing element 51 may include a processing unit 510, a memory unit 511 and a networking unit 512 by which the processing unit 510 is communicative with the associated restraints 20, with any sensors provided with the restraints 20 or otherwise and with a master restraint control panel (MRCP) 60 to be described below. The memory unit 511 has executable instructions stored thereon which are readable and executable by the processing unit 510. When they are read and executed by the processing unit 510, the executable instructions cause the processing unit 510 to operate generally as described herein.

The user interface 53 is generated and controlled by the processing unit 510 as noted above. Among other features, the user interface 53 provides an indication of a loading or unloading process currently in effect, a real-time readout of a currently assumed condition of each of the associated restraints 20 and an override switch. The override switch 532 allows loading personnel to override an instruction generated by the processing unit 510 and issued to any of the associated restraints 20 to assume a particular condition. This can be particularly useful in an event one of the associated restraints 20 fails to assume a particular condition in accordance with the instruction and needs to be manually adjusted.

With continued reference to FIG. 5 and with reference back to FIG. 2, the intelligent restraint system architecture 1 may further include the above noted MRCP 60. The MRCP 60 is coupled to or otherwise disposed in signal communication with each of the local RCPs $30_{1-3}$ and may include or be provided as a wired or wireless portable computing device 61 (e.g., a smartphone, a tablet, etc.) with a transceiver 62 that is coupled to or otherwise disposed in signal communication with each of the transmitters or transceivers 25 of each of the local RCPs $30_{1-3}$ to provide for such communications. In any case, the MRCP 60 includes similar features as the local RCPs $30_{1-3}$ and does not need to be described in further detail except to note that where the local RCPs $30_{1-3}$ offer control and information relating to the associated restraints 20, the MRCP 60 offers such control and information relating to all of the restraints 20.

In accordance with embodiments, it is to be understood that the MRCP 60 can also act as a gateway connecting the local RCPs $30_{1-3}$ to one another. In this way, each of the local RCPs $30_{1-3}$ can be modified to offer the control and information of those restraints 20 that are not directly associated with it.

Figure 6:
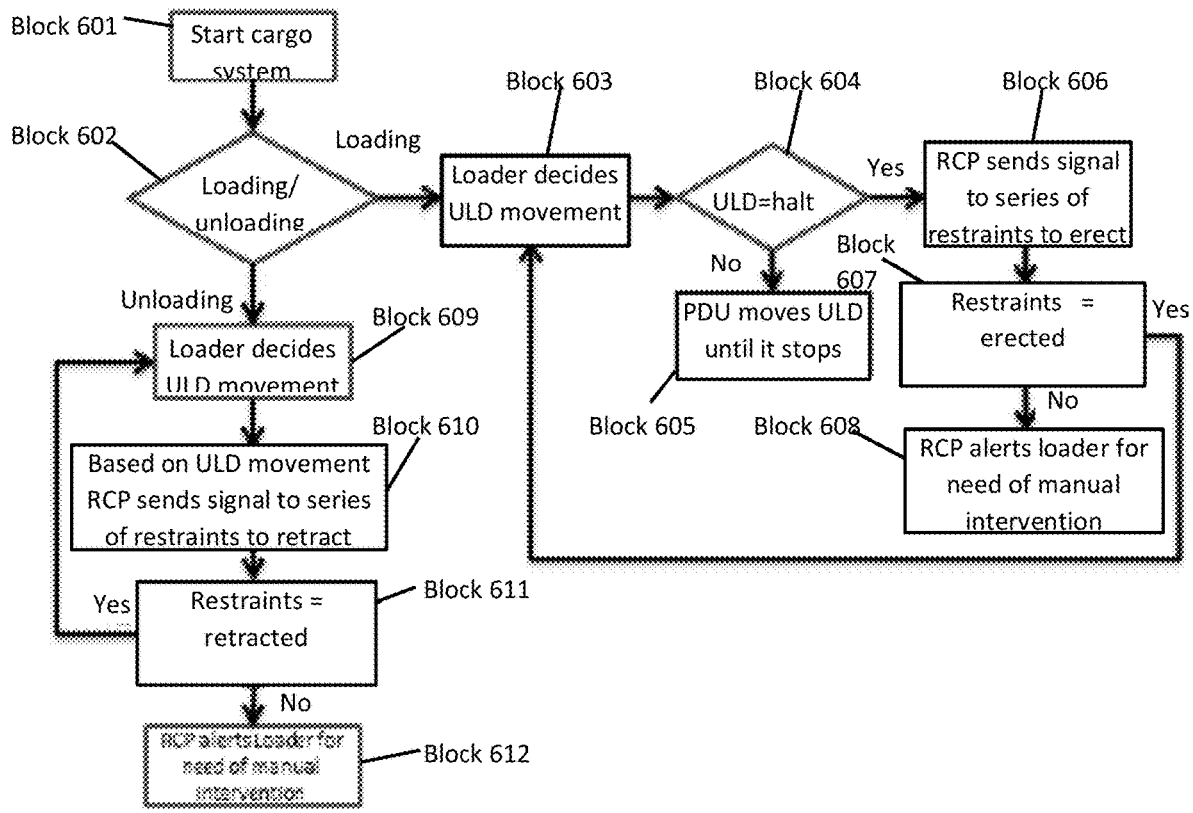
FIG. 6 is a flow diagram illustrating a method of operating an intelligent restraint system architecture in accordance with embodiments.

With reference to FIG. 6, a method of operating an intelligent restraint system architecture is provided. The method initially includes arraying the restraints 20 in the lines $L_{1-9}$, associating the local RCPs $30_{1-3}$ with proximal lines $L_{1-9}$ of the restraints 20 and initiating the system architecture (block 601). The method then includes determining whether a loading or unloading process is currently in effect (block 602).

In an event a loading process is in effect, loading personnel will decide on a particular ULD movement (block 603) and the method includes determining whether the ULD movement is halted (block 604). If not, the ULD movement continues (block 605). If the ULD movement is halted, the method includes automatically issuing instructions from the associated one of the local RCPs $30_{1-3}$ to the associated restraints 20 to assume a particular condition in accordance with a result of the determining (block 606). That is, if the determining reveals that the ULD movement is completed as shown in FIG. 4B, the local RCP $30_1$ will instruct the restraints 20 of line $L_3$ to assume the erected condition. At this point, the method includes confirming whether the associated restraints 20 respond to the instructions by, for example, determining whether the restraints 20 in line $L_3$ assumed the extended condition (block 607) and issuing an alert from the local RCP $30_1$ (or the MRCP 60) in an event the associated restraints 20 do not respond to the instructions (block 608).

In an event an unloading process is in effect, loading personnel will decide on a particular ULD movement (block 609) and the method includes determining whether the ULD movement continues or is halted and automatically issuing instructions from the associated one of the local RCPs $30_{1-3}$ to the associated restraints 20 to assume a particular condition in accordance with a result of the determining (block 610). That is, if the determining reveals that the ULD movement of the unloading process is about to begin from the configuration of FIG. 4B, the local RCP $30_1$ will instruct the restraints 20 of line $L_3$ to reassume the retracted condition. At this point, the method includes confirming whether the associated restraints 20 respond to the instructions by, for example, determining whether the restraints 20 in line $L_3$ assumed the retracted condition (block 611) and issuing an alert from the local RCP $30_1$ (or the MRCP 60) in an event the associated restraints 20 do not respond to the instructions (block 612).

Benefits of the features described herein are the automation of restraint functionality to reduce time and resources for loading and unloading of cargo. In detail, the intelligent restraint system architecture for air cargo can be used in autonomous cargo handling systems so that manual efforts involved in restraint operation can be eliminated. The position of restraints (locked or unlocked) is controlled electronically through local RCPs or through the MRCP on, for example, a wireless tablet interface. The status of the restraints will be available in real-time on the local RCPs as well as the MRCP. In addition, while the system architecture will not allow ULDs loading or unloading until the restraints are properly locked in desired positions, manual overriding is possible when there is an issue with any of the restraints. During flight, accidental unlocking can be reported to a flight deck as the system is intelligent and can be wirelessly connected with other control systems. Restraint working condition and its repair needs can be generated at ease.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An intelligent restraint system architecture for aircraft cargo, comprising:
   restraints arrayed along a cargo deck,
   each restraint comprising a main body and a pawl, the pawl being configured to normally assume a retracted condition relative to the main body at which cargo movement proximate to the restraint is permitted and to selectively assume an erected condition relative to the main body at which cargo movement proximate to the restraint is inhibited; and
   local restraint control panels (RCPs) respectively coupled to proximal restraints,
   each local RCP being receptive of a signal indicative of a cargo movement status and configured to automatically control each of the proximal restraints to selectively assume the erected condition or to re-assume the retracted condition in accordance with the signal being received and content thereof,
   wherein each of the restraints comprises a condition sensor disposed on the pawl for disposition below a cargo movement plane with the pawl assuming the retracted condition and above the cargo movement plane with the pawl assuming the erected condition to report a currently assumed condition of the restraint to the corresponding local RCP.

2. The intelligent restraint system architecture according to claim 1, further comprising local power drive units (PDUs) to power proximal RCPs.

3. The intelligent restraint system architecture according to claim 1, wherein each of the restraints comprises:
   a movement sensor to sense the cargo movement proximate to the restraint; and
   a transmitter configured to generate and issue the signal based on a sensing result of the movement sensor.

4. The intelligent restraint system architecture according to claim 1, wherein each of the local RCPs comprises an override switch.

5. The intelligent restraint system architecture according to claim 1, further comprising a master restraint control panel (MRCP) disposed in signal communication with each of the local RCPs.

6. The intelligent restraint system architecture according to claim 5, wherein the MRCP acts as a control and information gateway between each of the local RCPs.

7. The intelligent restraint system according to claim 5, wherein each of the local RCPs comprises a transceiver to communicate with the MRCP.

8. The intelligent restraint system according to claim 5, wherein the MRCP comprises a portable computing device.

9. An intelligent restraint system architecture for aircraft cargo, comprising:
   a cargo deck having a longitudinal axis;
   restraints arrayed in lines traversing the longitudinal axis,
   each restraint being comprising a main body and a pawl, the pawl being configured to normally assume a retracted condition relative to the main body at which cargo movement along the longitudinal axis and proximate to the restraint is permitted and to selectively assume an erected condition relative to the main body at which cargo movement along the longitudinal axis and proximate to the restraint is inhibited; and
   local restraint control panels (RCPs) arranged along the longitudinal axis and respectively coupled to proximal lines of restraints,
   each local RCP being receptive of a signal indicative of a cargo movement status and configured to automatically control each of the proximal lines of restraints to selectively assume the erected condition or to re-assume the retracted condition in accordance with the signal being received and content thereof, wherein each of the restraints comprises a condition sensor disposed on the pawl for disposition below a cargo movement plane with the pawl assuming the retracted condition and above the cargo movement plane with the pawl assuming the erected condition to report a currently assumed condition of the restraint to the corresponding local RCP.

10. The intelligent restraint system architecture according to claim 9, further comprising local power drive units (PDUs) to power proximal lines of RCPs.

11. The intelligent restraint system architecture according to claim 9, wherein each of the restraints comprises:
    a movement sensor to sense the cargo movement proximate to the line of the restraint; and
    a transceiver configured to generate and issue the signal based on a sensing result of the movement sensor.

12. The intelligent restraint system architecture according to claim 9, wherein each of the local RCPs comprises an override switch.

13. The intelligent restraint system architecture according to claim 9, further comprising a master restraint control panel (MRCP) disposed in signal communication with each of the local RCPs.

14. The intelligent restraint system architecture according to claim 13, wherein each of the local RCPs comprises a transceiver to communicate with the MRCP.

15. The intelligent restraint system architecture according to claim 13, wherein the MRCP acts as a control and information gateway between each of the local RCPs.

16. The intelligent restraint system architecture according to claim 13, wherein the MRCP comprises a portable computing device.

17. A method of operating an intelligent restraint system architecture, the method comprising:
    determining whether cargo movement is occurring;
    automatically issuing instructions from a single control panel to restraints associated with the control panel in accordance with a result of the determining;
    confirming whether the restraints respond to the instructions; and
    issuing an alert from the single control panel in an event the restraints do not respond to the instructions,
    wherein:
    each restraint comprises a main body and a pawl, the pawl being configured to normally assume a retracted condition relative to the main body at which cargo movement proximate to the restraint is permitted and to selectively assume an erected condition relative to the main body at which cargo movement proximate to the restraint is inhibited, and
    the confirming of whether the restraints respond to the instructions comprises determining whether a condition sensor, which is disposed on the pawl for disposition below a cargo movement plane with the pawl assuming the retracted condition and above the cargo movement plane with the pawl assuming the erected condition, reports that the pawl currently assumes the erected condition.

18. The method according to claim 15, wherein:
    the method further comprises determining whether cargo movement is occurring as part of a loading process, the determining of whether cargo movement is occurring comprises determining whether the cargo movement is halted and the automatically issuing of the instructions from the single control panel comprises instructing the restraints associated with the control panel to assume an erected condition, and
    the method further comprises determining whether cargo movement is occurring as part of an unloading process and the automatically issuing of the instructions from the single control panel comprises instructing the restraints associated with the control panel to assume a retracted condition.

* * * * *